Figure 1:
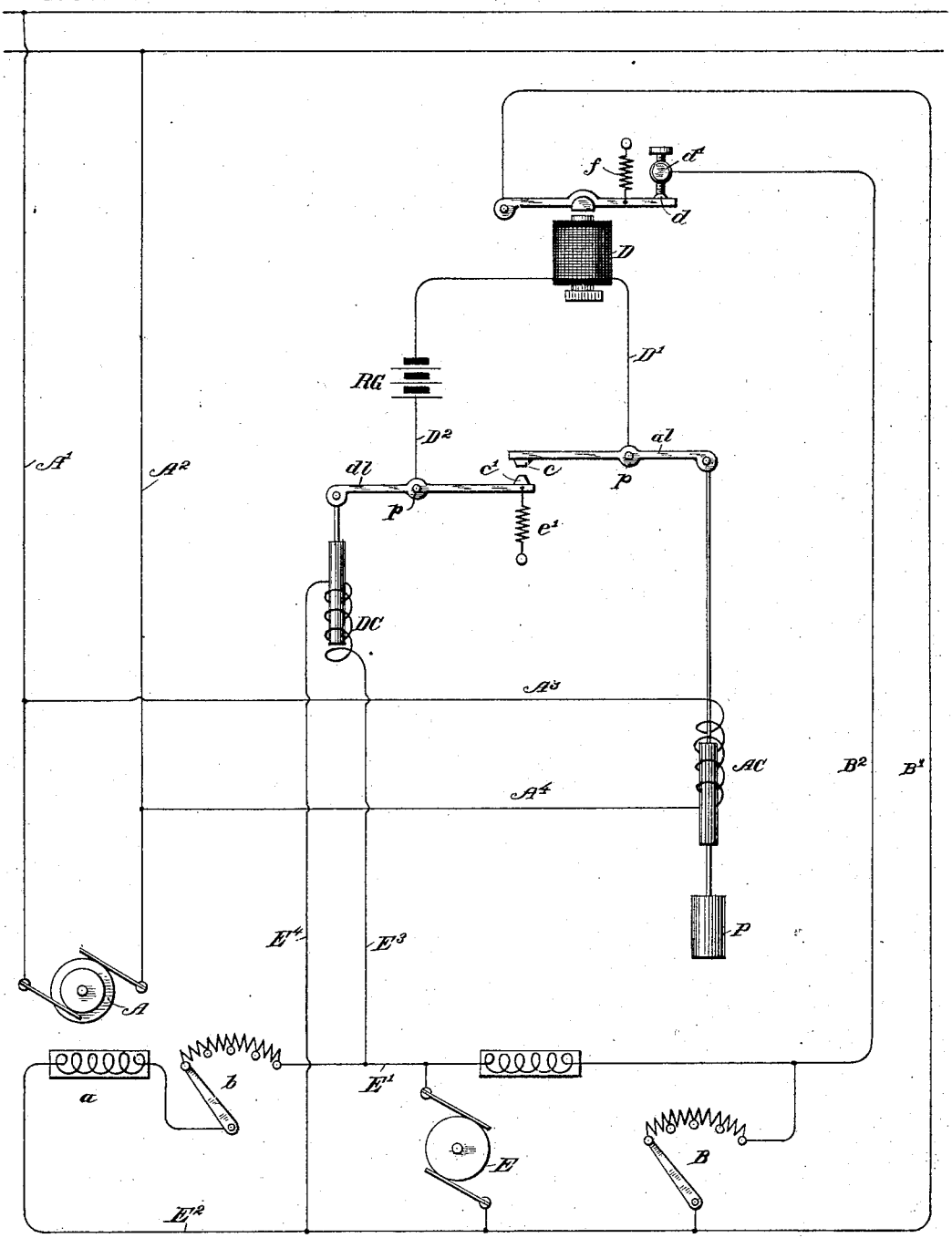

No. 725,800. PATENTED APR. 21, 1903.
A. A. TIRRILL.
AUTOMATIC POTENTIAL REGULATOR.
APPLICATION FILED DEC. 16, 1901.
NO MODEL. 11 SHEETS—SHEET 1.

No. 725,800. PATENTED APR. 21, 1903.
A. A. TIRRILL.
AUTOMATIC POTENTIAL REGULATOR.
APPLICATION FILED DEC. 16, 1901.
NO MODEL. 11 SHEETS—SHEET 2.

No. 725,800. PATENTED APR. 21, 1903.
A. A. TIRRILL.
AUTOMATIC POTENTIAL REGULATOR.
APPLICATION FILED DEC. 16, 1901.
NO MODEL. 11 SHEETS—SHEET 4.
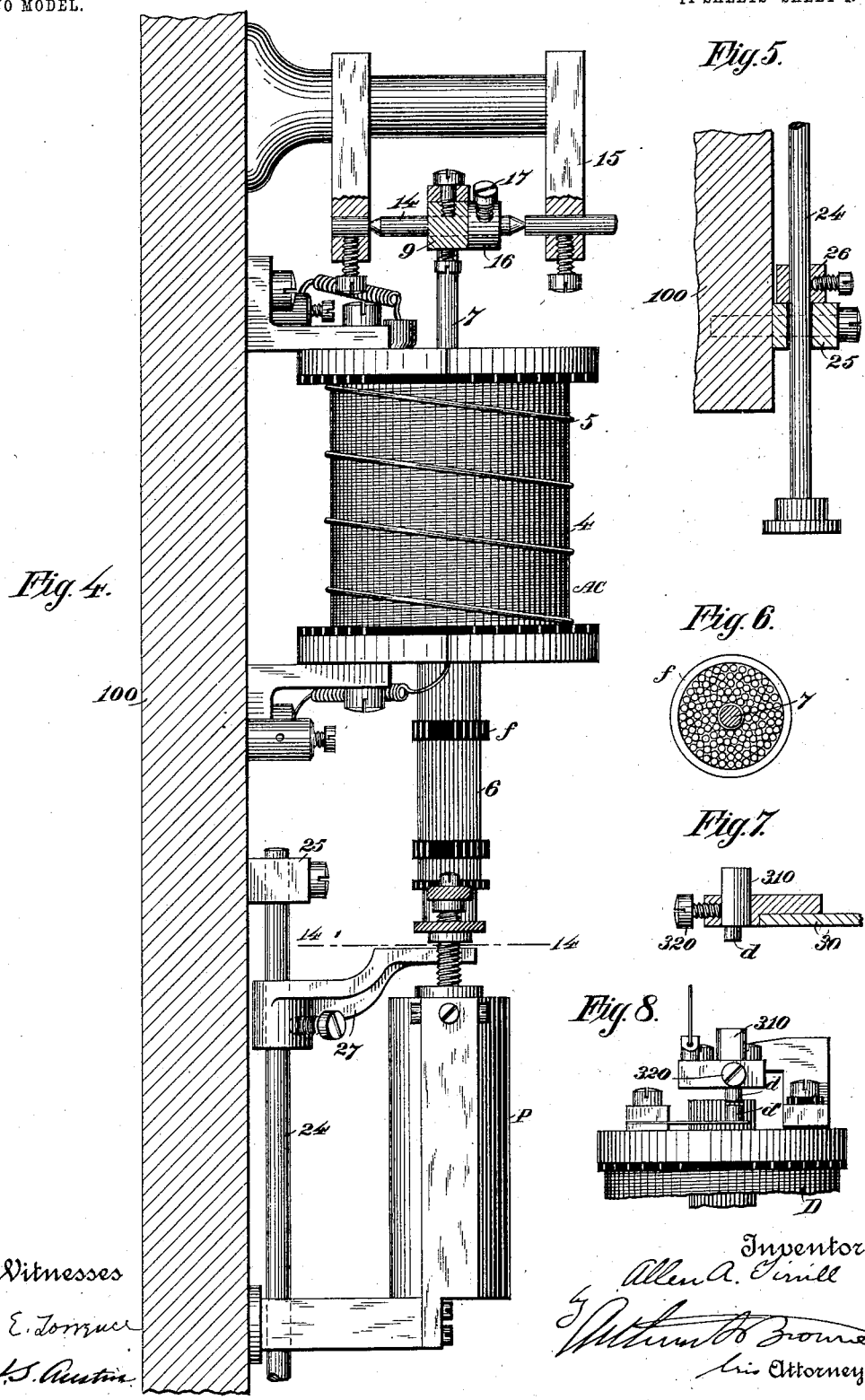

No. 725,800. PATENTED APR. 21, 1903.
A. A. TIRRILL.
AUTOMATIC POTENTIAL REGULATOR.
APPLICATION FILED DEC. 16, 1901.
NO MODEL. 11 SHEETS—SHEET 5.
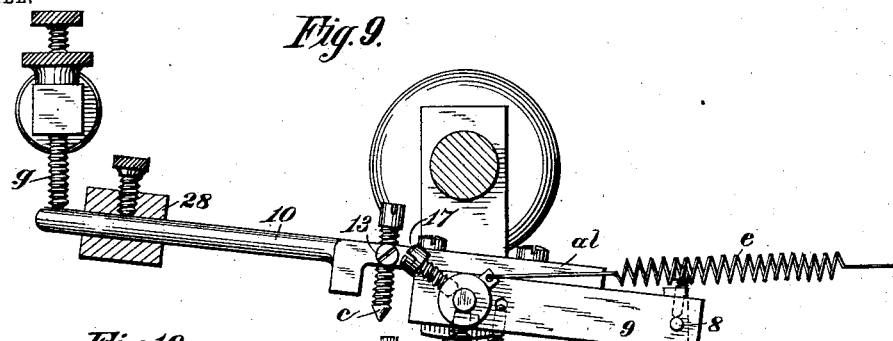
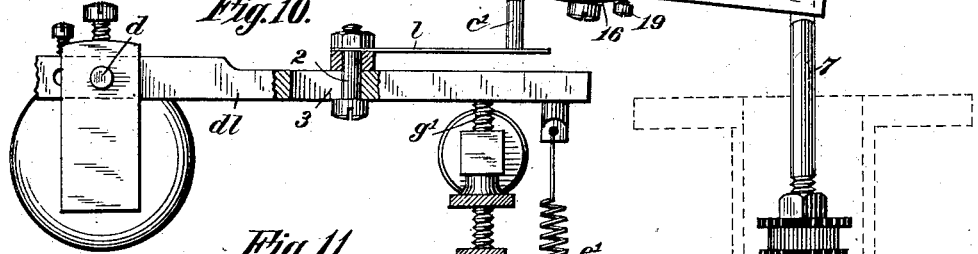
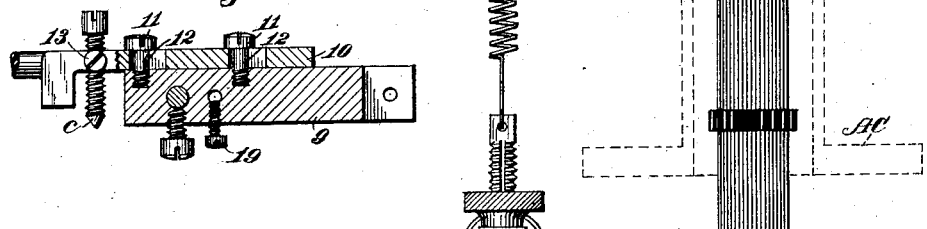
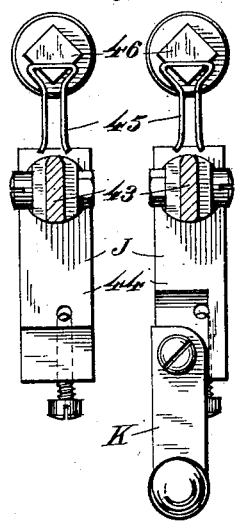
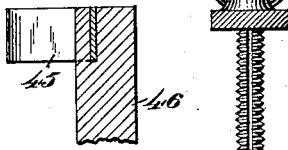
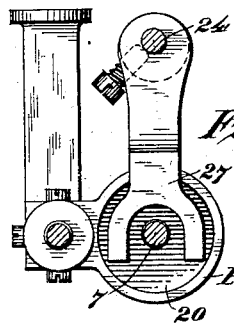
Witnesses
Inventor No. 725,800. PATENTED APR. 21, 1903.
A. A. TIRRILL.
AUTOMATIC POTENTIAL REGULATOR.
APPLICATION FILED DEC. 16, 1901.
NO MODEL. 11 SHEETS—SHEET 6.

Witnesses
M. E. Torrence
H. S. Austin

Inventor
Albert A. Tirrill
by Arthur R. Browne
his Attorney

No. 725,800. PATENTED APR. 21, 1903.
A. A. TIRRILL.
AUTOMATIC POTENTIAL REGULATOR.
APPLICATION FILED DEC. 16, 1901.
NO MODEL. 11 SHEETS—SHEET 7.
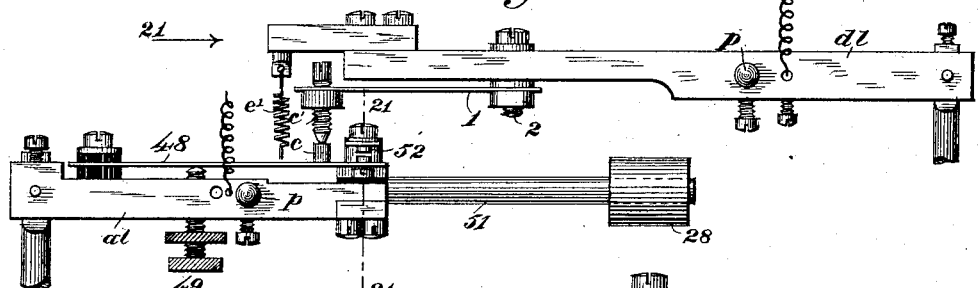
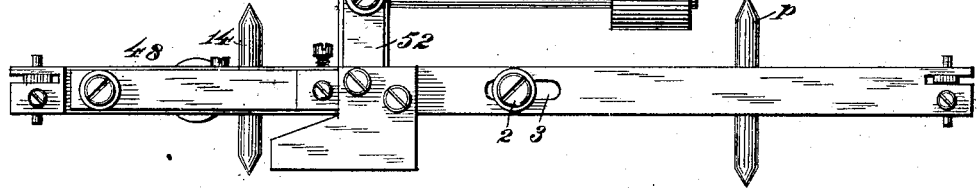
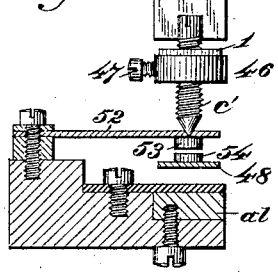
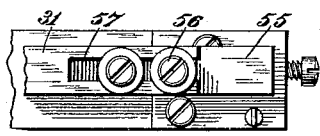
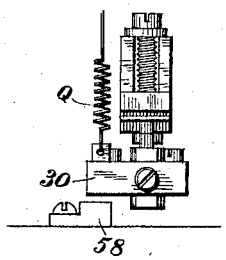
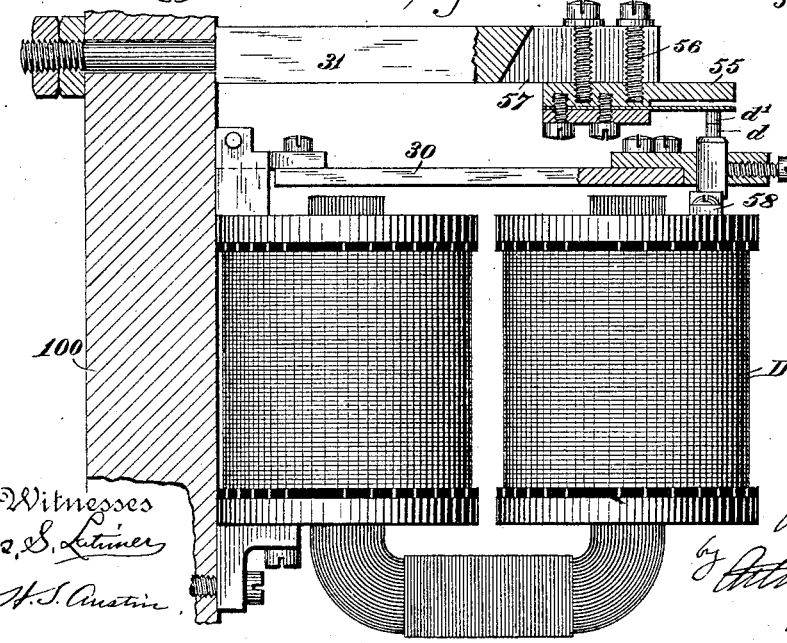
Witnesses
Inventor
Allen A. Tirrill
his Attorney No. 725,800. PATENTED APR. 21, 1903.
A. A. TIRRILL.
AUTOMATIC POTENTIAL REGULATOR.
APPLICATION FILED DEC. 16, 1901.
NO MODEL. 11 SHEETS—SHEET 8.

No. 725,800. PATENTED APR. 21, 1903.
A. A. TIRRILL.
AUTOMATIC POTENTIAL REGULATOR.
APPLICATION FILED DEC. 16, 1901.
NO MODEL. 11 SHEETS—SHEET 10.

Witnesses. Inventor.

No. 725,800. PATENTED APR. 21, 1903.
A. A. TIRRILL.
AUTOMATIC POTENTIAL REGULATOR.
APPLICATION FILED DEC. 16, 1901.
NO MODEL. 11 SHEETS—SHEET 11.

Witnesses
Sydney E. Taft.
H. S. Austin.

Inventor:
Allen A. Tirrill
by Arthur B. Browne
his Attorney

UNITED STATES PATENT OFFICE.

ALLEN A. TIRRILL, OF CONCORD, NEW HAMPSHIRE, ASSIGNOR TO GENERAL ELECTRIC COMPANY, OF SCHENECTADY, NEW YORK, A CORPORATION.

AUTOMATIC POTENTIAL-REGULATOR.

SPECIFICATION forming part of Letters Patent No. 725,800, dated April 21, 1903.

Application filed December 16, 1901. Serial No. 86,116. (No model.)

*To all whom it may concern:*

Be it known that I, ALLEN A. TIRRILL, a citizen of the United States, residing at Concord, in the county of Merrimack and State of New Hampshire, have invented certain new and useful Improvements in Automatic Potential-Regulators, of which the following is a specification.

The present invention consists in improvements upon the system and apparatus for automatic potential regulation described in United States Letters Patent No. 620,514, dated February 28, 1899, and in application for United States Letters Patent, Serial No. 12,721, filed April 13, 1900. The subject-matter of said patent and application is especially applicable to the regulation of direct-current dynamos.

A primary object of the present invention is to automatically regulate the potential of alternating-current dynamos, and in achieving this object many of the features of the said patent and application are utilized. While the regulation of alternating-current dynamos is the prime purpose of the present improvements, many of them are applicable to the regulation of direct-current dynamos, as will be hereinafter pointed out.

The present invention comprises many improved structural features and also different applications of its fundamental idea and amplifications which render its operation more perfect. In order that all of these matters may be clearly understood, it seems expedient at the outset to first describe the foundation idea of the invention reduced to a simple form and stripped of numerous additions and details, many of which, as will hereinafter appear, are of great importance.

To this end reference will first be made to the diagram Figure 1 of the drawings, which illustrates the bald outlines of the invention in an extremely elementary way, only a single refinement being illustrated. In this diagram, A is an alternating-current dynamo, A' A² the supply-mains fed thereby, and E is the exciter. As illustrated, the field $a$ of the alternator is in the mains E' E² of the exciter. A hand-adjusted resistance $b$ is in the exciter-mains, and there is a regulating resistance B in the exciter-shunt. This regulating resistance may also be hand-adjusted; but when once thus adjusted it is adapted to be automatically cut in and out to effect the automatic regulation, its action in this respect being similar to that of the regulating resistance of the said application Serial No. 12,721. There are two controlling regulating-magnets AC and DC, which, as shown, are solenoids with their respective cores so located that increase in potential lifts one solenoid-core and depresses the other. The solenoid DC is in a shunt $E^3$ $E^4$ from the exciter-mains, and the solenoid AC is in a shunt $A^3$ $A^4$ from the alternator-mains, and hence these solenoids may be appropriately termed the "direct controlling-magnet" and the "alternating controlling-magnet," respectively. The cores of these two solenoids are hung, respectively, from the outer ends of levers $dl$ and $al$, each pivoted at $p$. The direct-magnet core is balanced against the pull of the solenoid by spring $e'$, while the other core may be balanced by gravity only. The said two levers are pivoted one above the other, and one carries a contact $c$ and the other a contact $c'$, these constituting a pair of coöperating contacts capable of approach and separation as their carrying-levers oscillate under the varying excitations of the two solenoid-cores. The core of the alternating controlling-magnet AC is connected with a suitable retarder, such as a dash-pot P. These two contacts $c$ $c'$ constitute the terminals of an electric circuit which preferably includes a regulating relay-magnet D. This relay may receive electric current from any source of generation and conveniently from the exciter, but is shown in a circuit D' D², supplied from an independent source RG. The relay-armature controls a pair of regulating-contacts $d$ $d'$, one movable with the armature and the other being carried by any suitable support. These contacts $d$ $d'$ constitute the terminals of an electric circuit B' B², which is a shunt around the regulating resistance B in the exciter-field circuit.

In the arrangement shown in the diagram Fig. 1 when the solenoid-contacts $c$ $c'$ are open the relay-circuit D' D² is broken, and hence the relay-armature is moved up by the spring $f$, and hence the contacts $d$ $d'$ come in contact, thus closing the regulating-circuit B' B², and thereby shunting the entire regulating resistance. When, however, the solenoid-contacts $c$ $c'$ come together, the relay-circuit D' D² is closed, the regulating-circuit B' B² is opened, and hence the regulating resistance B is thrown into circuit. When the regulating resistance is shunted, the potential of the exciter rises, and thus the potential of the alternator and on the supply-mains is increased, and hence in turn the two solenoids become more powerful. This results in bringing the solenoid-contacts $c$ $c'$ together, and hence (as above stated) the relay-contacts $d$ $d'$ separate, thereby bringing the regulating resistance into action. This brings all of the resistance into the exciter-field shunt-circuit, thus reducing the potential of the exciter and that of the alternator, thereby decreasing the force of the solenoids, so that the contacts $c$ $c'$ are opened. This results in again shunting the regulating resistance. In other words, stated generally, increase in potential puts the regulating resistance into action and decrease in potential puts it out of action. The same effects, generally speaking, are produced from any change in potential on the feed-mains due to changes in the load produced by the bringing into and out of action any of the current-users fed by the alternator or from any other cause. It is hence evident that by properly proportioning the regulating resistance the potential can be maintained substantially constant, as explained in full in the aforesaid application Serial No. 12,721.

The reason for the employment of the two solenoids will be understood from the following discussion. At the outset it will be assumed that the regulator is in operation and that the alternator voltage is steady. Under these circumstances the main contact-points $c$ and $c'$ are successively opening and closing at a rate necessary to maintain such voltage and the two levers $al$ and $dl$ are moving slightly, $al$ being practically stationary, as it is retarded by the dash-pot P, while lever $dl$ is supplying most of the motion necessary to open and close the relay-circuit. This successive opening and closing of the main contact-points is caused by the slight successive rise and fall of the exciter voltage due to cutting out and in the regulating resistance B by the opening and closing of the relay-circuit through the main contact-points. This slight rise and fall in exciter voltage theoretically and probably actually to a slight degree simultaneously affects the alternator voltage, so that both main contact-points are actuated by the change in voltage of the currents in their respective magnets AC and DC and both contribute to the result of holding the voltage steady. The lever $dl$ is held in position by the pull of the direct controlling-magnet DC on its core against its spring $e'$, which may be adjusted as hereinafter described. As the voltage of the exciter-current increases or decreases the pull against said spring of said magnet DC increases or decreases, hence tilting lever $dl$ one way or the other until the force of said spring (which is increased or diminished as said lever moves) becomes equalized. It will be seen, then, that the end of lever $dl$ upon which contact $c'$ is carried will assume a position nearer or farther from its normal position according as the exciter voltage is higher or lower and as the pull of magnet DC is correspondingly increased or diminished. Now let it be assumed that the voltage in the alternating mains is increased. This increases the pull of alternating controlling-magnet AC, causing its core to travel up into said magnet, thereby pushing up on lever $al$ and causing contact $c$ to remain for a longer period in touch with contact $c'$. This tendency of the contact-points to remain together, acting through the relay, causes the rheostat or regulating resistance to remain cut in longer than would otherwise be the case, thereby lowering the voltage in the exciter and its magnet DC. This permits spring $e'$ to pull down the lever $dl$ as the voltage in the exciter is lowered until the exciter voltage reaches the stage necessary to reduce the alternating voltage to the desired normal point. It will be remembered that as the exciter voltage falls the alternator voltage falls, reducing the pull of alternating controlling-magnet AC, and consequently the tendency of contact-point $c$ to remain longer in touch with contact $c'$. As soon as the exciter voltage reaches the necessary point and the alternating voltage its normal point the movement of lever $dl$ away from its normal position of contact-point $c$ ceases, the lever being tilted in a position determined by the voltage of the exciter working through the exciter-magnet against spring $e'$, and contact-point $c$, carried on lever $al$, loses at the same instant its tendency to remain longer in touch with contact-point $c'$, the lever $al$ being then tilted sufficiently to keep point $c$ near enough to point $c'$ to continue its functions. The voltage in the alternator-mains being restored and the voltage of the exciter being reduced to counteract the disturbing factor, the two contact-points continue to operate in their new position, tending to remain enough longer in touch to keep the exciter-rheostat or regulating resistance cut in for a sufficient preponderance of time to keep the exciter-current at its new voltage. Any tendency in the exciter voltage to rise is checked, because such tendency, however slight, will cause a like tendency in the alternator voltage, increasing the pull of the magnets AC and DC and tending to hold points $c$ and $c'$ longer in contact, and thus to keep the voltage of the exciter down.

Any decrease in voltage in the alternating mains will be corrected in an inverse manner, the points $c$ and $c'$ finally assuming a point determined by the new exciter voltage, which will become established at exactly the point necessary to counteract the disturbing factor. This change in the tilt of said levers and of the position of the contact-points may be summarized as follows:

Any change in the alternator-mains will correspondingly affect the strength of the alternating controlling-magnet and (acting through its lever upon the main contact-point controlled thereby, which said contact-point will thereby have a tendency to remain for a longer period in contact with or separated from the other point) will cause a change in exciter voltage sufficient to restore the alternator voltage to the desired point. This change in exciter voltage will change the position of the contact-point controlled by the exciter or direct controlling-magnet and its connections until the force of the exciter or direct controlling-magnet equalizes with the force of its opposing spring. The alternating lever and its contact-point will assume a position corresponding to the new position of the exciter-lever and its contact-point, and by the joint action of the two contact-points, actuated by the influence of the currents in their respective magnets, the voltage of the exciter will be held steady at the point necessary to hold the alternating voltage at the desired point.

The dash-pot connected with the core of the alternating magnet serves the double purpose of moderating the movement of the lever and contact-point connected therewith when a change in voltage occurs and of preventing excessive movement of its contact-point while the regulator is holding the voltage steady when no external disturbing cause is affecting the alternating voltage, while the exciter-lever and contact-point are left free to move as the proper operation of the regulator requires.

It will be noted that the foregoing operation involves a pair of contacts movable toward each other, which control the action of the regulating resistance, and that one of these contacts is controlled in its movement by change of voltage in the exciter-mains and the other by change of voltage in the alternator-mains. As far as the broad features are concerned the controlling electromagnetic devices for these contacts may be of any suitable kind and their connection with the contacts can be effected in any desired way which will produce the results.

The contacts $c$ $c'$ might directly control the regulating resistance shunt, but practice shows that they would quickly be destroyed and rendered inoperative by sparking, and hence the relay D is used for the reasons fully set forth in said Patent No. 620,514 and said application Serial No. 12,721.

As above suggested, the relay may be actuated by any source of electricity, and in many instances (as, for example, where the change in load is excessive) it is desirable to actuate it by an independent source, so that the action of the relay may not be affected by change in the exciter voltage. A small separate generator, a rotary converter, a storage battery, or other appropriate source of electric energy may be employed.

The importance of the two coöperating contacts, one controlled by the exciter and the other by the alternator, arises from the fact that with the direct controlling-magnet omitted (which, in effect, would represent the device set forth in said application Serial No. 12,721) the exciter voltage would not be established and maintained at the required point, but would continue successively to become carried above and below the required point. This so-called "pumping" effect is entirely eliminated by the present arrangement. What may therefore be regarded as the fundamental principle of the present improvement when applied to the regulation of alternating machines is the combination of the exciter and alternator controlled coöperating contacts, which in turn control the action of the regulating resistance.

In order that the various details of the present improvements may be understood, there will first be described one successful practical embodiment thereof. In the description no reference to modifications or amplifications will be made, such matters being reserved until after the single embodiment has been fully described.

Figure 2:
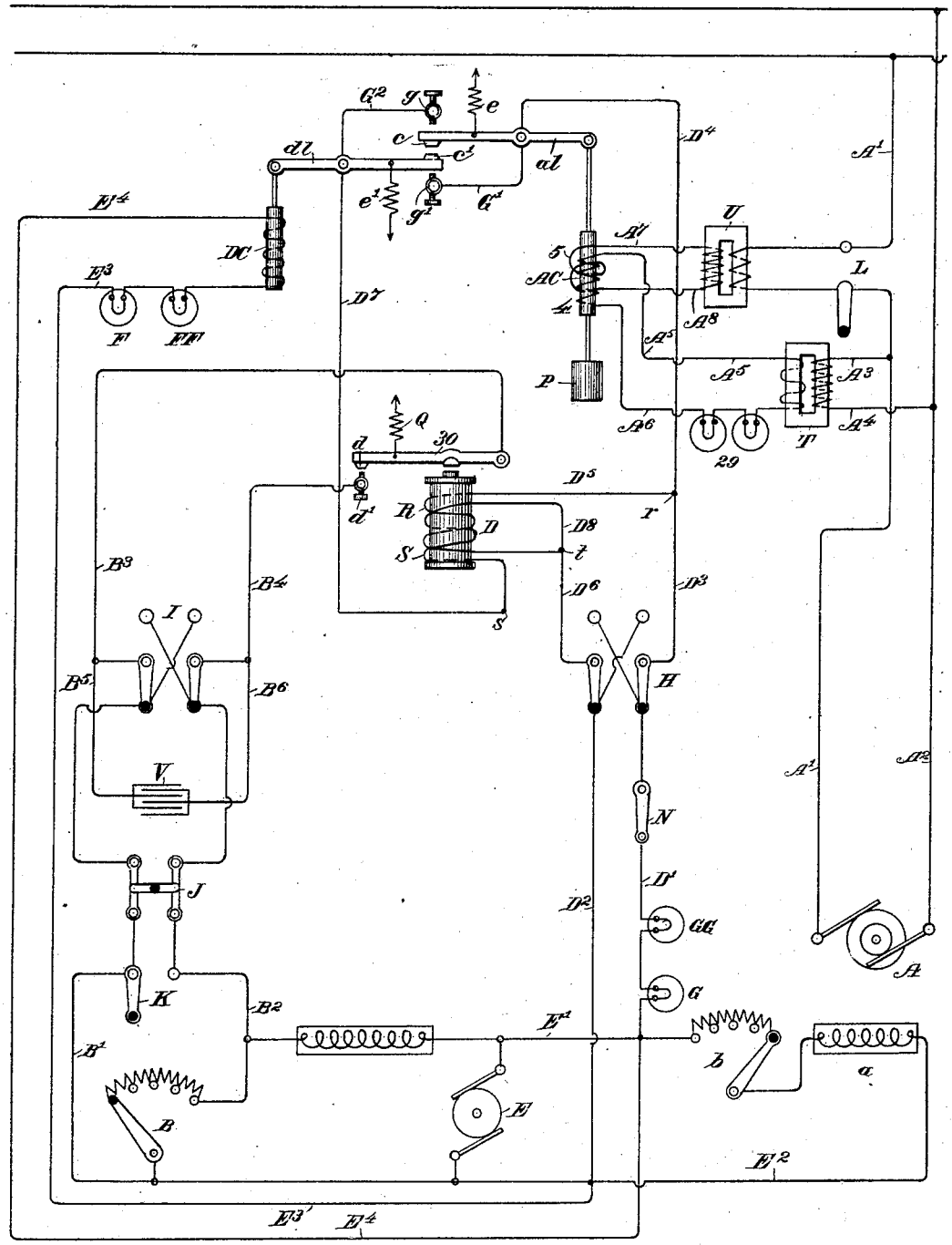
Figure 3:
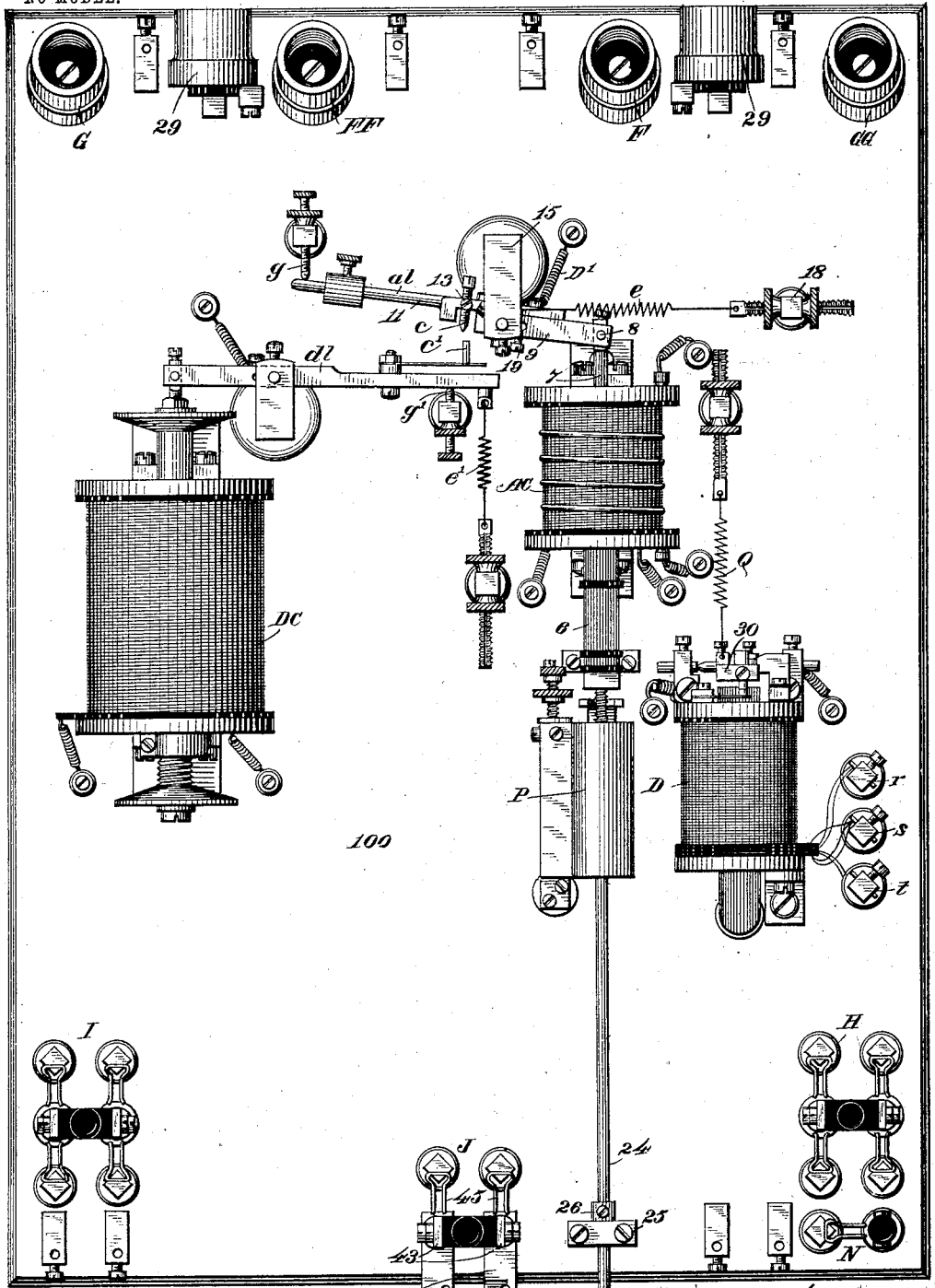
Figure 15:
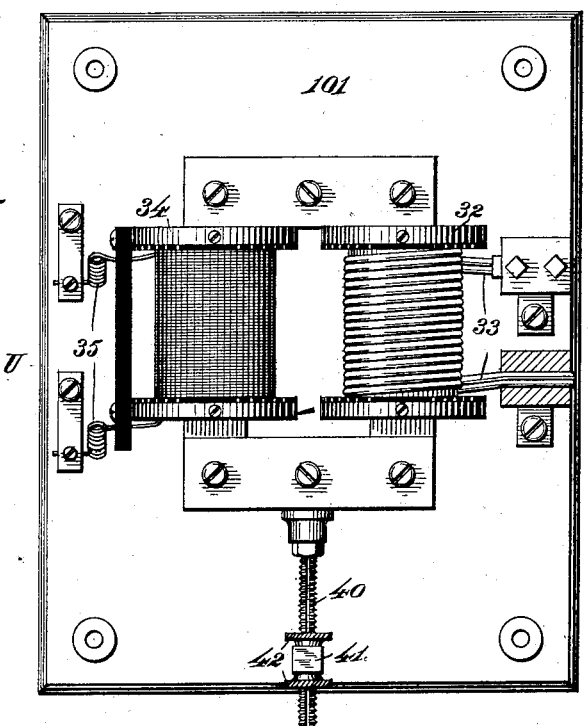
Figure 16:
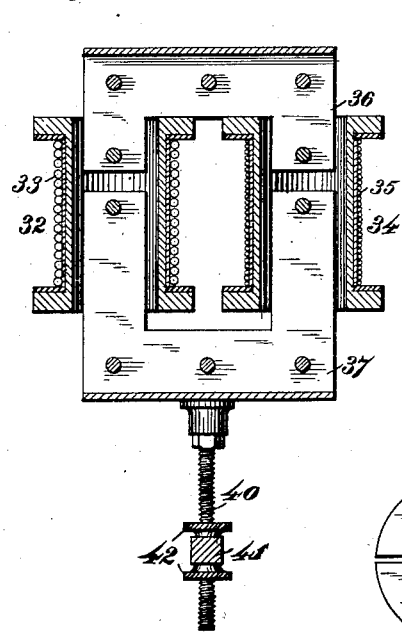
Figure 17:
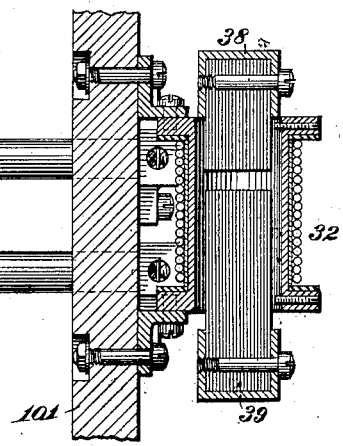
Figure 18:
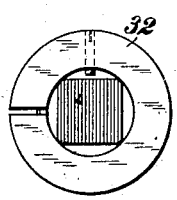

The diagram Fig. 2 shows the electrical circuits and the various instruments diagrammatically. Fig. 3 shows a front view of the principal instruments, which in practice are grouped on a single slab. Fig 4 is a side view, partly in section, of the alternator controlling-magnet AC. Fig. 5 is a detail of the hand-rod for moving the core of said magnet AC. Fig. 6 is a cross-section of said core. Figs. 7 and 8 are detail views of the relay-contacts. Fig. 9 is a front view of the core of the alternator controlling-magnet and of its lever, showing the dash-pot in longitudinal section. Fig. 10 is a front view of one end of the lever carrying the contact, which is controlled by the direct controlling-magnet, Figs. 9 and 10 being shown in the same relative position that the parts illustrated thereby occupy. Fig. 11 is a vertical longitudinal section through the lever of the alternator controlling-magnet. Figs. 12 and 13 are details of the starting-switch mechanism. Fig. 14 is a cross-section in the plane indicated by the line 14 14 in Figs. 4 and 9. Fig. 15 is a plan view of the series transformer which is used to compensate for loss of potential in the working line. Figs. 16 and 17 are vertical sections (in planes at right angles to each other) of said transformer. Fig. 18 is a plan view of one of the coils of the transformer with the upper core removed. Fig. 19 is a side view of the levers $al$ and $dl$ of the magnets AC and DC, respectively. In this instance the relative position of the levers is the reverse of what is shown in Fig. 3. Fig.

Figure 25:
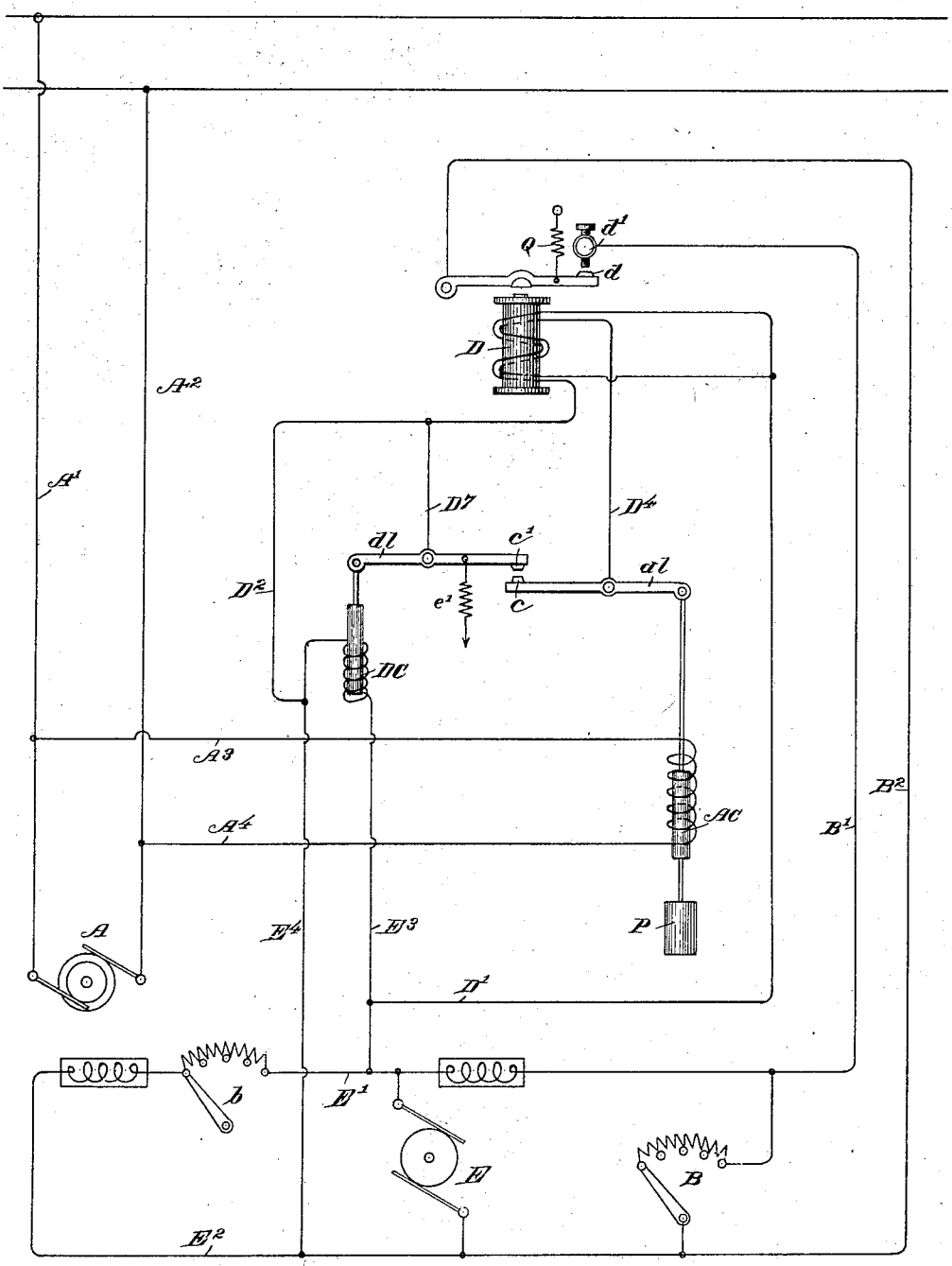
Figure 26:
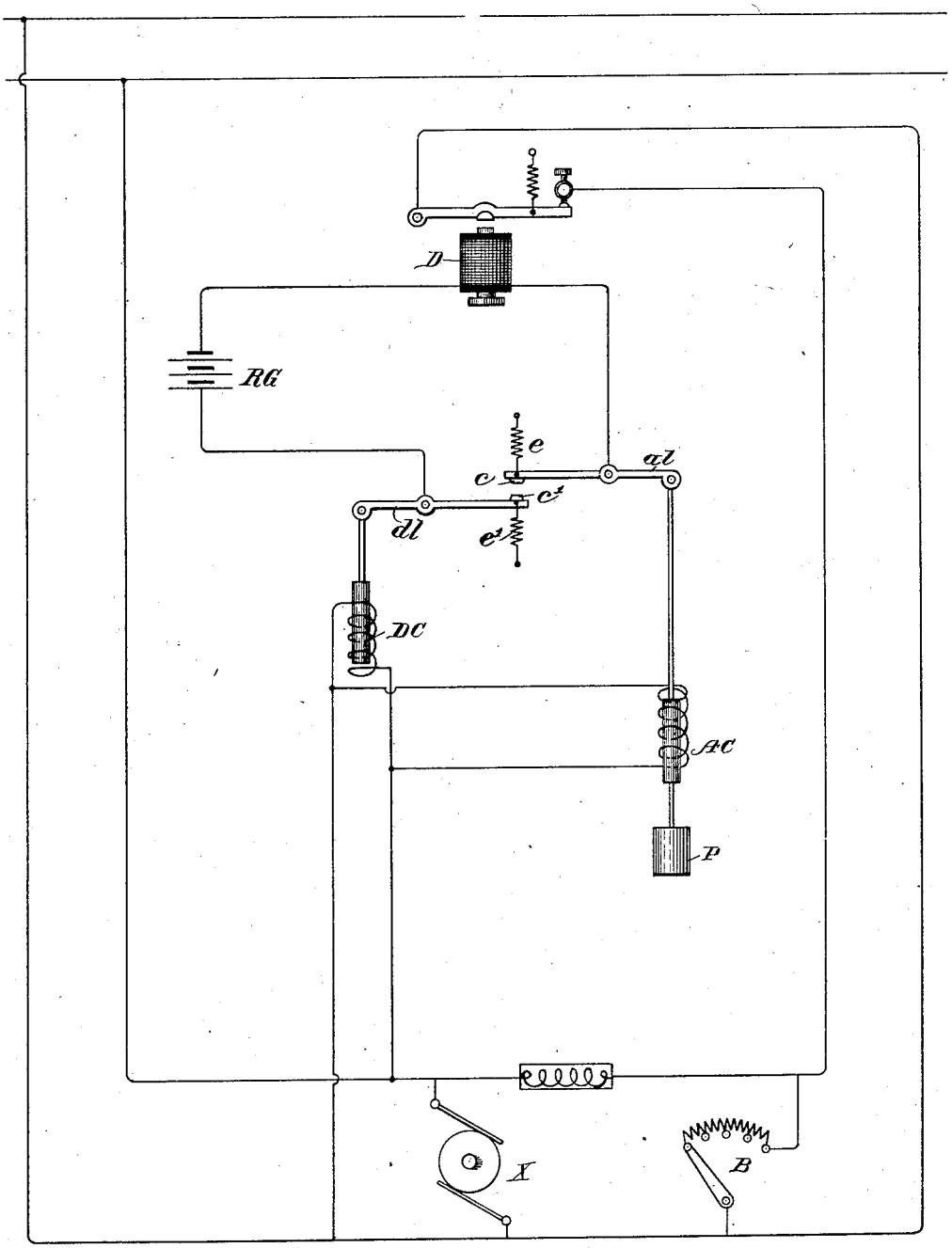
Figure 27:
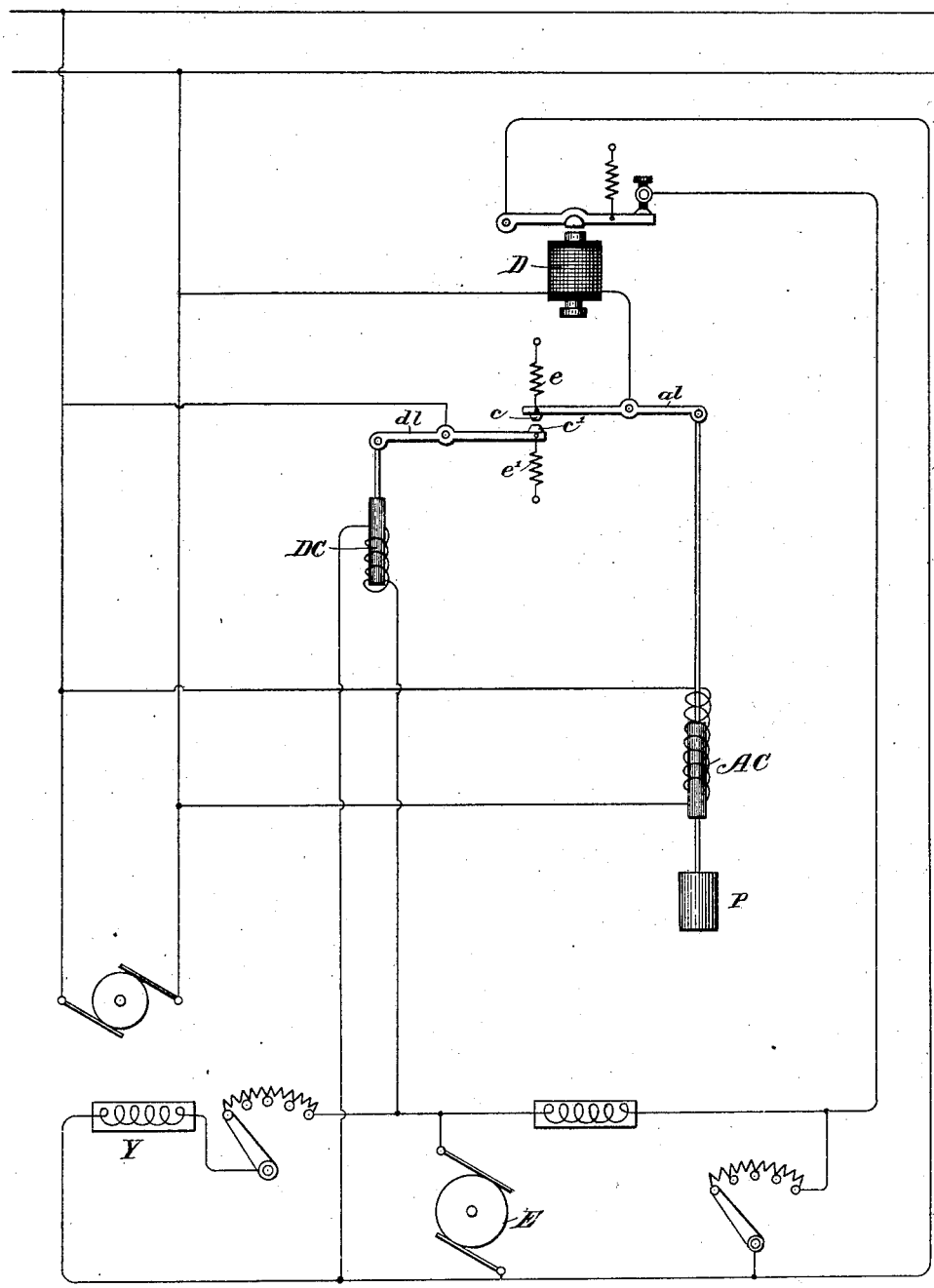
Figure 28:
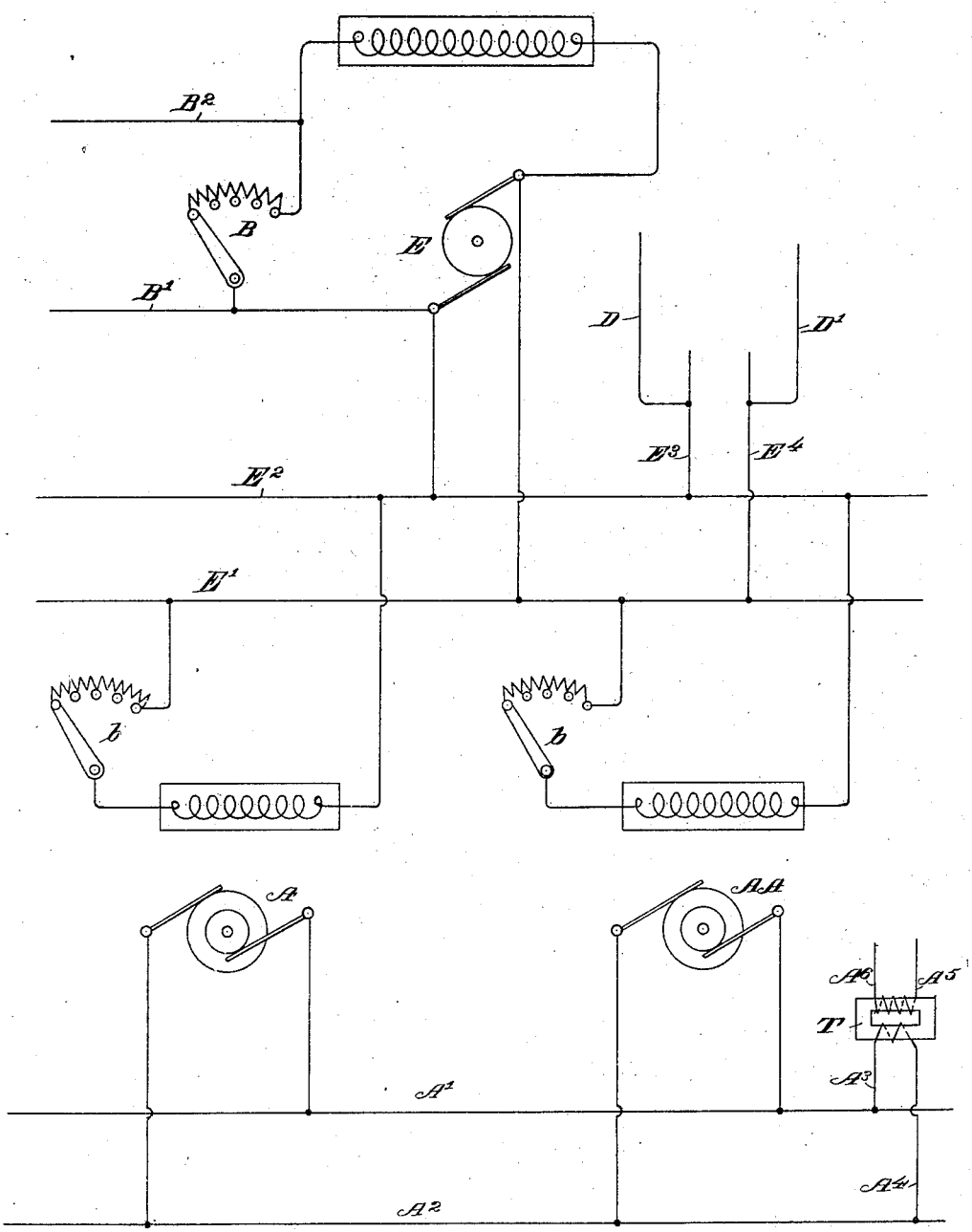

20 is a plan view of said levers. Fig. 21 is an end view of the lever $dl$ looking at it in the direction of the arrow 21 in Fig. 19, and it is a vertical section of the lever $al$ in the plane indicated by the line 21 21 in Fig. 19. Fig. 21 is on a larger scale than Figs. 19 and 20. Fig. 22 is a side view, partly in section, of the relay-magnet. Fig. 23 is a plan view, and Fig. 24 an end view, of the contact end of the armature and of the corresponding end of the post which carries the other relay-contact. Fig. 25 is a simplified diagram, similar to Fig. 1, showing the differences involved by this preferred arrangement. Figs. 26, 27 represent the application of the invention to direct-current generators. Fig. 28 shows the regulator applied to a plurality of generators having a single exciter.

As shown in Fig. 3, the direct controlling-magnet DC, the alternator controlling-magnet AC, and the relay-magnet D are all mounted on a common marble (or equivalent) slab 100. The construction of the direct controlling-magnet DC and of its lever $dl$ and the means for adjusting its spring $e'$ are the same as in said application Serial No. 12,721, and hence need not be here specifically described. The only difference is in the manner in which the contact $c'$ is connected to the lever $dl$. As best shown in Fig. 10, the contact $c'$ (of platinum or other suitable material) is carried near the end of an elastic or spring arm 1, which is connected with a post 2, which is longitudinally adjustable in a slot 3 in the lever $dl$, so that the position of the contact may be adjusted at will, and the contact itself is a yielding one. An adjustable stop $g'$ limits the swing of lever $dl$.

The coil of the alternator-controlling magnet AC, Figs. 2 and 4, has two sets of windings 4 and 5, the purpose of which will be hereinafter explained; but otherwise its coils are constructed like those of an ordinary solenoid. The core or armature 6 is composed of a bundle of longitudinally-extending laminated wires or small rods of soft iron, as best shown in Fig. 6, suitably held together by bands $f$, of vulcanized fiber or other material, and connected with a central longitudinal supporting-rod 7, which is pivotally suspended at 8 to the outer end of the lever $al$, as best shown in Fig. 9. Said lever $al$ is composed of two sections 9 and 10, (see Fig. 11,) which are adjustably connected by screws 11 and slots 12, so that the position of the contact $c$, carried by the section 10, can be adjustable in order that it may properly register with the other contact $c'$. The contact $c$ is in the form of a screw tapping through the section 10 for adjustment and held in place by the set-screw 13. The other lever-section 9 is pivoted by arbor 14 (see Fig. 4) in a suitable fixed bracket 15. On the arbor 14 is an adjustable collar 16, held in place by set-screw 17, to which collar is attached one end of a spring $e$, the other end of said spring being adjustably attached to a fixed post 18, (see Fig. 3,) said spring, if employed, aiding gravity in moving the core against the pull of the solenoid. Binding-screw 19 connects the conducting-wire D' to the lever $al$. An adjustable stop $g$ limits the swing of the lever $al$. The lower end of the rod 7 of the core of the magnet AC enters the dash-pot P and has a piston 20, fitting the cylindrical interior of said dash-pot, as best shown in Fig. 9. The dash-pot cylinder communicates, by ports 21 21 above and below the piston, with a longitudinal passage 22, which is controlled by a valve 23, which is vertically adjustable to and from its seat, so as to regulate the effective capacity of the passage 22, thereby enabling the sensitiveness of the dash-pot to be regulated. Light machine-oil is preferably used in the dash-pot, and its flow as the piston moves up and down is regulated by the adjustment of the valve 23.

When the regulator is not in use, the weight of the core 6 holds the lever $al$ against stop $g$, as shown in Fig. 9, thus separating the contacts $c\ c'$, since spring $e'$ at the same time also holds the lever $dl$ against the stop $g'$.

In starting the regulator in operation it is important to bring the contacts together, and to enable this to be done means are employed for lifting the core 6. These means include a starting-rod 24, which slides vertically in fixed guides 25 25 (see Figs. 3, 4, and 5) and which is held in place by adjustable collar 26. Said starting-rod has adjustably secured to its upper end a fork 27, (see Fig. 14,) which straddles the stem or rod 7 beneath the core 6. (See Figs. 4 and 9.) When the starting-rod is pushed up by the push-button on its lower end, the fork 27 encounters the lower end of the core 6, thereby raising said core, and hence bringing the contacts $c\ c'$ together. When the contact has been made, the starting-rod is released and drops down out of the way by gravity.

The core 6 is so related to the coils of the magnet AC that effective increase of current elevates the core, and as the current decreases the core drops under its own weight. To aid in the regulation of the magnet AC, a counterpoise 28 is adjustable on the section 10 of lever $al$, as best shown in Fig. 9.

Non-inductive resistances are used, as in said application Serial No. 12,721, and for this purpose incandescent lamps may be used. The sockets for such lamps are illustrated in Fig. 3. As here shown, the sockets F and FF are in the circuit of the magnet DC, and the sockets G and GG are in the circuit of the relay D, as in said application Serial No. 12,721. Two additional sockets 29 29 in the present case are shown, which are in circuit with the alternator-magnet AC, as indicated in the diagram Fig. 2. The relay-magnet D is a differential magnet, in all respects like that of said application Serial No. 12,721, with coils R and S, Fig. 2, and posts $r\ s\ t$, Fig. 3, except in certain specific details, as follows: The contact $d$ on the armature 30 is located on the end of a post 310, which extends through the end of the armature, (see Fig. 7,) and said post is held in place by set-screw 320. This enables the contact $d$ to be properly adjusted relatively to the spring-mounted contact $d'$. Reversing hand-switches H and I (see Fig. 3) are employed, just as in said application Serial No. 12,721, to reverse the flow of the current from time to time through the contacts $c c'$ and $d d'$, respectively, and the same switch N is employed to render inoperative or operative the regulator at will. As heretofore stated, the coil of the magnet AC has two windings 4 and 5, of which the winding 4 is in circuit with the shunt $A^3 A^4$ from the alternator-mains. Preferably and as shown in Fig. 2 this winding 4 is not in a direct shunt, but is in circuit with the secondary of a parallel or multiple transformer T, the primary of which is in the shunt $A^3 A^4$. By thus placing the magnet AC in a transformed shunt the voltage is reduced to practical limits for use in the regulator. The non-inductive resistances 29 29 are in this transformed shunt-circuit and have the same function as the resistances F FF in the circuit of the direct-controlling magnet DC. The other winding 5 of the magnet AC is in circuit with the secondary coil of a special series transformer U for purposes which will be fully explained after describing the construction of the said transformer.

As shown in Figs. 15 and 17, the transformer U is mounted on a slab 101, separate from the slab carrying the other instrumentalities. The primary coil 32 of the transformer has a limited number of convolutions of heavy wire 33, through which may flow the whole or a portion of the total current of one of the mains, as $A'$, of the alternator, as indicated in Fig. 2. The secondary coil 34 of this transformer has a large number of convolutions of fine wire 35 in circuit with the winding 5 of the magnet AC. The two coils 32 and 34 have two horseshoe-cores 36 37, common to both coils. Both cores are laminated, each comprising a plurality of thin horseshoe-shaped soft-iron plates bolted together and secured to suitable cap-plates 38 39. One leg of each core enters the primary coil and the other leg enters the secondary coil. The upper core remains in its normal place; but the lower core is vertically adjustable by means of the adjusting-stem 40, post 41, and nuts 42 42, whereby the transformed current in the secondary can be regulated. Each leg of each core is substantially rectangular in cross-section, as indicated in Fig. 18. The purpose of this series transformer is to compensate for line losses in the working circuit of the alternator. It is well known in transmitting electrical energy that the line loss increases substantially proportionally to the current flowing. It is frequently the case that the generating plant is located at a considerable distance from the place where the energy is to be used. Consequently it is necessary to raise the voltage at the generator as the working load increases in order to maintain constant voltage at the place of use. The series transformer U is to effect this purpose. This transformer is placed in series with one of the mains, so as to take a definite proportion of the total current. One winding 5 of the magnet AC is in circuit with the secondary of this transformer and is so connected up that the current flows therein in pulsations opposite in direction to those in the other winding 4, through which the current from the parallel transformer T flows. The ampere-turns in the main winding 4 are greater than those in the auxiliary winding 5, and consequently the current in the main winding 4 is that which energizes the magnet AC, and the effect of current flowing through the auxiliary winding 5 is simply to diminish the effect of the current in the main winding 4. Let it be assumed that none of the consumers are using the current, then practically no current will be flowing through the working mains, and consequently no current will flow through the auxiliary winding 5, and hence the main winding 4 will have its maximum effect on the regulator and it may be assumed will then maintain the transformed voltage at one hundred and ten, for example. If then the full working load is brought into action and its effect would be to cause the transformed voltage at the distant place of use to drop to one hundred owing to line loss, it is evident that the voltage at the generator must be raised accordingly. Now as the flow of current increases to supply the demand on the working circuit the current through the auxiliary winding 5 increases proportionally, and consequently reduces the magnetic effect of the main winding 4, and as the result the core of magnet AC drops proportionately, thus varying the position at which the contacts $c$ and $c'$ operate, thereby permitting the regulator to operate at a higher generator voltage and to maintain this higher voltage at the generator, and consequently maintaining a constant voltage at the distant place of use.

To give one set of proportions which will be a guide in reproducing the apparatus, it may be stated that in practice I have used eight convolutions in the primary 32 of the transformer U, one hundred and sixty convolutions in the secondary 34 of said transformer, eleven hundred ampere-turns in the main winding 4, and one hundred and ten ampere-turns in the auxiliary winding 5. These details will, however, vary in accordance with conditions in each particular case, as will be understood by skilled electricians.

The transformer U may be omitted, and all or a portion of the total current may pass directly through the auxiliary winding 5, which in such case would have very few turns.

The diagram Fig. 2 shows a complete system. The main winding 4 of the alternator-controlling magnet AC is in the circuit $A^5 A^6$ of the secondary of the parallel transformer T, the incandescent lamps 29 29, constituting non-inductive external resistance, being in this circuit. The primary of said transformer is in a shunt $A^3$ $A^4$ of the alternator-mains $A'$ $A^2$. The auxiliary winding 5 of the magnet AC is in the circuit $A^7$ $A^8$ of the secondary of the series transformer U, the primary of which is a portion of the main $A'$. A switch L enables the main current to flow across the transformer U, thus enabling the current to be maintained in case of damage to the transformer or in case it is desired to render all parts of the regulator inoperative. The direct controlling-magnet DC is in the shunt-circuit $E^3$ $E^4$ from the exciter-mains $E'$ $E^2$, the incandescent lamps F FF being in this shunt-circuit. In this diagram the relay D is not operated by an independent generator, but is in a shunt $D'$ $D^2$ from the exciter-mains $E'$ $E^2$. The circuit-wires $D'$ $D^2$ lead to the reversing-switch H, the cut-off switch N being employed in this circuit, and the lamps G GG being therein, all as in said application Serial No. 12,721. Conductor $D^3$ leads from the reversing-switch to post $r$, where it branches, branch $D^4$ leading to the lever $al$, and hence to main contact $c$, and the branch $D^5$ leading to the winding R of the relay, the current then passing to post $t$ by conductor $D^6$ to the return-wire $D^2$, so that current constantly flows through the winding R, thus normally attracting the armature 30 against the tension of retracting-spring Q, and hence closing the relay-contacts $d$ $d'$. When, however, the controlling-contacts $c$ $c'$ are closed, the current flows from conductor $D^4$ through lever $al$, contacts $c$ $c'$, lever $dl$, and conductor $D^7$ to post $s$, and thence around the other winding S of the relay through conductor $D^8$ to post $t$, and thence by conductor $D^6$ to the return-wire $D^2$, thus sending current around the relay in the opposite direction to that flowing through winding R, thus neutralizing the same, demagnetizing the relay, and permitting spring Q to withdraw the armature 30, and hence to separate the relay-contacts $d$ $d'$, thereby producing the same effects, as previously described herein in relation to the diagram Fig. 1. The contacts $d$ $d'$ control the regulating resistance B in the same way as in said application Serial No. 12,721. The shunt-wires $B'$ $B^2$ bridge across the resistance B. These wires lead to reversing-switch I, which is connected by wires $B^3$ $B^4$ to the contacts $d$ and $d'$, respectively, and a bridge $B^5$ and $B^6$ across said wires contains a condenser V to lessen sparking at said contacts, all as in said application. These circuit connections differ from those of said application, owing to the presence of the controlling-switch J and the starting-switch K.

The controlling-switch J is shown in Figs. 3, 12, and 13. It is a two-pole switch, comprising two mechanically-connected conducting-bars 43 43, insulated from each other, each being pivotally connected to a metal conducting base-plate 44 in just the same way as are the pivoted metal bars of the reversing-switches H and I, as described in said application Serial No. 12,721. The conductors $B'$ $B^2$ lead to these plates 44 44, respectively. These pivoted conducting-bars 43 43 swing simultaneously into and out of contact with spring clip-contacts 45 45, carried, respectively, near the upper ends of posts 46 46, which latter are connected by appropriate wires with the proper terminals of the reversing-switch I. Fig. 12 shows the bars 43 in such position that relay-contacts $d$ $d'$ are not in circuit. By swinging said bars toward the contacts 45 electrical connection is made at two places simultaneously, thus bringing said relay-contacts $d$ $d'$ into operative relation to the exciter. By manipulating this switch J it will be noted that the entire regulating effect of the regulator can be controlled. When this switch is open, the regulator is inoperative and the entire field-current of the exciter must pass all of the time through the resistance B.

The starting-switch K is for the purpose of enabling the field of the exciter to build up quickly on starting the generator. As shown in Figs. 3 and 12, this switch K is pivoted loosely to one of the plates 44, and it normally hangs by gravity in the position shown in Fig. 12, where it is inoperative. By swinging it up to the position shown in Fig. 3 it connects the two plates 44 44 electrically, thus bridging across the resistance B temporarily, thus cutting off all extraneous resistance in the field-shunt of the exciter E, and hence enabling it to build up rapidly. In the meantime the switch J is closed, and then when the generator is in proper operation the switch K is let go, it resumes its inoperative position by gravity, and the regulator and resistance B are left in full operation.

To avoid dangerous rise of potential in case of accident to the circuit of either of the controlling-magnets AC or DC, protecting means are employed similar to those employed in said application Serial No. 12,721. Stop $g'$ for lever $dl$ is connected by wire $G'$ with conductor $D^4$, and stop $g$ for lever $al$ is connected by wire $G^2$ with conductor $D^7$. Consequently if the conductor supplying current to either magnet AC or DC fails the corresponding lever will be pulled back against its protecting-stop, the circuit from $D^4$ to $D^7$ will be permanently closed, the winding S of relay D will be permanently in circuit, the relay-contacts $d$ $d'$ will be permanently open, and likewise the regulating resistance B will be permanently in circuit, hence preventing dangerous rise in potential and having the same effect as if the regulator was not in use.

In the arrangements which have thus far been described the regulating-magnets AC and DC are so arranged that their contacts $c$ $c'$ come together as the potential rises and separate as it falls. I prefer, however, to arrange the apparatus so that just the opposite effect shall take place, the same ultimate end being, however, produced by a similar reversal of the action of the relay. The less preferred arrangement has been described first, because more nearly resembling the arrangement set forth in said application Serial No. 12,721. The preferred arrangement is illustrated in Figs. 19 to 25, inclusive.

As shown in Fig. 19, the alternator magnet-lever al is below the direct magnet-lever dl, thus bringing contact c below contact c' instead of above it, as before. The levers are pivoted at p and the same retracting-springs are employed. The spring e' is shown, but not the spring e, which, however, may be employed, and, if so, is connected to a sleeve on the arbor 14, just as before. The contact c' is formed by a screw adjustable vertically in block 46, Fig. 21, and held by set-screw 47, said block being soldered or otherwise connected to the outer end of spring-arm 1, which is adjustable by post 2 and slot 3, as before. The other contact c is carried near the end of a spring-arm 48, which is connected to, but insulated from the lever al. The tension of this spring-arm is regulated by adjusting-screw 49 tapping through the lever, insulation being secured in any suitable manner, as by making said screw of hard rubber. Spring-arm 48 should be adjusted so as to be stiffer than spring-arm 1. The lever al has a lateral offset 50, which carries the arm 51, having the adjusting-weight 28, as shown in Fig. 20, so that there will be no interference with the lever dl. To this offset 50 (see Fig. 21) is secured one end of a spring-arm 52 in electrical connection with the lever al, and hence with the conductor $D^4$, said arm having a contact 53, which registers normally with an auxiliary contact 54 on the spring-arm 48 near the contact c. Figs. 19 and 21 show these contacts 53 and 54 separated to facilitate understanding their relation; but normally they are in contact, so that normally the contact c is in electrical connection with the conductor $D^4$. The purpose of these auxiliary contacts 53 54 is for protection in case of accident, as will hereinafter be explained. The relay-contacts d d' are arranged just opposite to those of the relay shown in Figs. 2, 3, 7, and 8. In this case the armature 30 is beneath the post 31, which carries the spring-contact d', thus bringing armature-contact d beneath the contact d' instead of above it, as before. The spring-contact d' is carried by a plate 55, which is adjustable on the post 31 by screws 56 and slot 57. The spring Q for elevating the armature 30 is shown in Fig. 24. The movement of armature 30 toward the magnet D is limited by fixed stop 58. This improved and preferred arrangement of relay and controlling levers is shown in the diagram Fig. 25, which is simplified as much as possible. It will be understood, however, that it is preferred to employ with this arrangement the various transformers, non-inductive resistances, reversing-switches, condensers, and other adjuncts shown in Fig. 2, but which are omitted from Fig. 25 to facilitate understanding thereof. In this case when there is no voltage the contacts c c' are pulled toward each other, and as the result the auxiliary contacts 53 and 54 are forced apart, thus breaking the circuit through the conductors $D^4$ and $D^7$, and consequently no current flows through the winding S of the relay. If at the same time there be no current in the relay-winding R, as will be the case if it obtains its current from the same system as the magnet DC, as shown in Fig. 25, the spring Q acts and keeps the contacts d d' closed, and this may ordinarily be regarded as the condition of affairs with no voltage. In this condition with the relay-contacts closed the regulating resistance is cut out, and consequently the exciter is in condition to build up rapidly when the generator is started, thus doing away with a special starting-switch and starting-rod. When the system begins to operate, the contacts c c' are closed, both differential relay-circuits R S are closed, thus demagnetizing relay-cores and allowing armature 30 to follow the pull of its spring Q, and its contact d is in contact with upper or stationary contact d'. This cuts out the regulating resistance B, allowing voltage to rise. As soon as voltage rises both controlling-magnets AC and DC begin to strengthen and open the main lever-contacts c c' when the normal voltage is reached. This in turn opens the differential relay-circuit S, and the relay-core becoming magnetized overcomes the tension-spring Q and draws armature 30, with its contact d, down against stop 58, thereby opening relay-contacts and throwing in the regulating resistance B. This action continues to and fro as long as the regulator is in operation. The advantages of this preferred type of regulator are as follows: The exciter voltage in sudden and extreme changes in the alternating load cannot go low enough with this new type of regulator to throw it out of operation, as the relay-contacts even with no voltage in relay-cores would be closed and would tend to build the voltage up to normal before opening again. It avoids the yawning effect sometimes caused in the first-described regulator in main lever-contacts c c' by sudden changes in load or speed, as said contacts now tend to lie together. As the preferred regulator will start itself, the use of any starting-switch, such as the switch K, and the raising up of the core 6 by hand through rod 24 are avoided, and these devices are omitted. All the circuits remain the same as in the first-described regulator, with the exception that main contacts and relay-contacts work in exact opposition and the protecting-wires $G'$ $G^2$ are omitted.

The protecting-wires $G'$ $G^2$ are not necessary, because in case either magnet AC or DC gives out the circuit through relay-winding S is broken, and consequently the current flowing through winding R keeps the armature 30 held down, thus keeping contacts d d' separated, and hence leaving the regulating resistance B in full permanent operation, thus preventing dangerous rise of potential in the alternator-mains.

The present improvements, although especially applicable to the regulation of alternating generators, are also admirably adapted to the regulation of direct-current generators. For the purpose of showing how the improvements can be applied to such generators the skeleton diagrams Figs. 26 and 27 are annexed, Fig. 26 showing the connections when the two controlling-magnets AC and DC are used with a shunt-field direct-current generator X with a relay D having an independent generator, and Fig. 27 showing the controlling-magnets employed with a separately-excited direct-current generator Y with a relay D energized by a shunt from the generator-mains. It will be readily understood without specific illustrations that various of the auxiliary features previously described are applicable to either of these arrangements. The present improved regulator can also be employed for the simultaneous regulation of a plurality of generators, either alternating or direct, as will be readily understood by the skilled electrician. Among the arrangements which will readily suggest themselves may be mentioned the following: First, a plurality of alternating generators feeding the same mains can be arranged each with its own exciter and regulator, and this I prefer; second, a plurality of generators feeding the same mains, with their several exciters in parallel, can be used with a single regulator controlling all of their rheostats simultaneously, equalizing resistances being employed, if necessary; third, a plurality of generators can be used to feed the same mains with independent exciters, any one of which exciters may be used for all of the generators with a single regulator adapted to be brought into connection with the particular exciter in use by means of appropriate switches; fourth, a plurality of generators can feed the same mains, and a single exciter can be used therefor, with a single regulator. The last of these suggested arrangements is shown in Fig. 28, in which A and AA are two alternators and E is the common exciter therefor. The various connections for the instruments of the regulator are shown, lettered as in the preceding views.

Various modifications in addition to those already suggested will readily occur to the skilled electrician and can be made without departing from the spirit of the invention. For a further example it may be stated that if the compound winding of the alternator-controlling magnet is employed the series transformer U may be omitted and one or more turns of one of the main feed-conductors can pass directly around said magnet.

I claim as my invention—

1. A regulator for a dynamo having a regulating resistance, comprising, in combination, a pair of contacts which by their mutual approach and separation control the regulating resistance, each of said contacts being controlled by its own magnet.

2. A generator having a separate exciter, in combination with a regulating resistance, a regulator comprising a pair of contacts which by their mutual approach and separation control the regulating resistance, each of said contacts being controlled by its own magnet, one of said magnets being energized by the exciter and the other by the generator.

3. An alternating-current generator and its exciter, in combination with a regulating resistance, a regulator comprising a pair of contacts which by their mutual approach and separation control the regulating resistance, each of said contacts being controlled by its own magnet, one of said magnets being energized by the exciter and the other by the alternator.

4. A regulator for a dynamo having a regulating resistance, comprising, in combination, a pair of contacts which by their mutual approach and separation control the regulating resistance, each of said contacts being controlled by its own magnet, said contacts and magnets being so arranged that increase in potential causes said contacts to separate, and decrease in potential causes them to approach.

5. A regulator for a dynamo having a regulating resistance, comprising, in combination, a pair of contacts which by their mutual approach and separation control the regulating resistance, each of said contacts being controlled by its own magnet, said contacts tending to approach each other as the potential decreases, and tending to separate as the potential rises, said contacts being also so arranged as to break the circuit therethrough when there is no current flowing through either of said magnets.

6. A generator and its exciter, in combination with a regulating resistance, a relay-magnet controlling said resistance, a regulator comprising a pair of contacts which by their mutual approach and separation control said relay, each of said contacts being controlled by its own magnet, one of said magnets being energized by the exciter and the other by the generator.

7. An alternating-current generator and its exciter, in combination with a regulating resistance, a relay-magnet controlling said resistance, a regulator comprising a pair of contacts which by their mutual approach and separation control said relay, each of said contacts being controlled by its own magnet, one of said magnets being energized by the exciter and the other by the alternator.

8. A regulator for a dynamo having a regulating resistance, comprising, in combination, a relay-magnet, a pair of contacts which by their mutual approach and separation control said relay-magnet, each of said contacts being controlled by its own magnet, said relay-magnet in turn controlling a pair of contacts which by their mutual approach and separation control the regulating resistance, said relay-magnet having two windings, one of which is constantly in circuit and the other of which is controlled by said main contacts.

9. A regulator for a dynamo having a regulating resistance comprising, in combination, a relay-magnet, a pair of main contacts which by their mutual approach and separation control said relay-magnet, each of said contacts being controlled by its own magnet, said relay-magnet in turn controlling a pair of contacts which by their mutual approach and separation control the regulating resistance, said relay-magnet having two windings, one of which is constantly in circuit and the other of which is controlled by said main contacts, said windings of the relay being so arranged that the relay-armature operating one of said contacts will be released when the current energizes both windings and will be attracted when it energizes only the winding permanently in circuit.

10. An alternating-current generator and its exciter, having a regulating resistance, in combination with a regulator comprising a pair of contacts which by their mutual approach and separation control the regulating resistance, each of said contacts being controlled by its own magnet, one of said magnets being energized by the exciter and the other by the alternator, and a transformer being interposed between the alternator and the magnet energized thereby.

11. An alternating-current generator and its exciter having a regulating resistance, in combination with a regulator comprising a pair of contacts which by their mutual approach and separation control the regulating resistance, each of said contacts being controlled by its own magnet, one of said magnets being energized by the exciter and the other by the alternator, the alternating magnet having two windings in opposite directions, and a parallel transformer between the alternator and one of said windings, whereby line loss is compensated for.

12. An alternating-current generator and its exciter having a regulating resistance, in combination with a regulator comprising a pair of contacts which by their mutual approach and separation control the regulating resistance, each of said contacts being controlled by its own magnet, one of said magnets being energized by the exciter and the other by the alternator, the alternating magnet having two windings in opposite directions, a parallel transformer being interposed between the alternator and one of said windings, and a series transformer being interposed between the alternator and the other of said windings whereby line loss is compensated for.

13. A regulator for a dynamo having a regulating resistance, comprising, in combination, a pair of contacts which by their mutual approach and separation control the regulating resistance, each of said contacts being controlled by its own magnet, and an external resistance in the circuit of each of said magnets.

14. A self-starting regulator for a dynamo with an exciter having a regulating resistance, comprising, in combination, a pair of main contacts which by their mutual approach and separation control the regulating resistance through a relay-magnet, each of said contacts being controlled by its own magnet, said contacts tending to separate as the potential rises and to approach as the potential falls, and a differentially-wound relay-magnet having a pair of contacts which by their approach and separation control the regulating resistance, said relay-magnet having two windings in opposite directions one of which is always in circuit and the other of which is controlled by said main contacts, said relay-contacts being so arranged that they close when current flows through both windings and they open when the current flows through only one winding.

15. A plurality of generators feeding the same mains, and means for exciting the same, in combination with a regulator having a pair of regulating-contacts, one of which is controlled by current from the mains, and the other of which is controlled by the exciting-current.

16. The combination of a dynamo-electric machine, an exciter therefor, and a regulator for said machine consisting of coacting contacts for controlling the current of the exciter, one contact moving with the exciter voltage and the other with the voltage of said dynamo-electric machine.

17. The combination of an alternating-current generator, an exciter therefor, a pair of contacts for opening and closing a shunt-circuit about resistance in the field of said exciter, and magnets excited respectively by the exciter voltage and the generator voltage for controlling said contacts.

18. The combination of an alternating-current generator, a source of current of variable electromotive force for exciting the field of said generator, and means responsive both to the generator voltage and to the voltage of said source for regulating the voltage of said source.

19. The combination of an alternating-current dynamo-electric machine, a source of current of variable electromotive force for exciting the field thereof, and a controlling-circuit for said source responsive to variations of voltage both of said machine and of said source.

20. The combination of a dynamo-electric machine, a voltage-controlling circuit therefor having a contact making and breaking device, and a plurality of magnetic devices each energized from a different source for operating said make and break device.

21. The combination of a dynamo-electric machine, an exciter therefor, and means for regulating the field resistance of the exciter in response both to the exciter voltage and to the voltage of said dynamo-electric machine.

22. The combination of a dynamo-electric machine, means for exciting the field of said machine, and means for regulating said excitation in response both to variation of the voltage at the regulated point and to the excitation voltage but independently of the action of the excitation voltage through the fields of the exciter and of said dynamo-electric machine.

23. The combination of a dynamo-electric machine, a source of current for exciting said dynamo-electric machine, and means for regulating the voltage of said source in response both to the voltage produced by said machine and the voltage of said source but independently of the reaction of the voltage of said source upon itself or through the field of said machine.

In witness whereof I have hereunto signed my name in the presence of two subscribing witnesses.

ALLEN A. TIRRILL.

Witnesses:
GEO. B. LANDER,
JOHN P. WRIGHT.